United States Patent [19]

Pranger

[11] Patent Number: 4,756,692
[45] Date of Patent: Jul. 12, 1988

[54] TEACHING AID APPARATUS

[76] Inventor: Leslie J. Pranger, 1719 C.R. #23, Waterloo, Ind. 46793

[21] Appl. No.: 97,209

[22] Filed: Sep. 15, 1987

[51] Int. Cl.$^4$ ............................................. G09B 19/00
[52] U.S. Cl. .................................. 434/245; 434/126; 273/1 L
[58] Field of Search ............... 434/245, 107, 126, 236, 434/430; 273/1 L; 272/8 R; 222/158, 154, 481, 478

[56] References Cited

U.S. PATENT DOCUMENTS

| | | | |
|---|---|---|---|
| 221,433 | 11/1879 | Warner | 434/126 |
| 976,371 | 11/1910 | Jeans et al. | 273/1 L |
| 1,107,481 | 8/1914 | Boggs | 272/8 R |
| 1,454,426 | 5/1923 | Clements | 273/1 L |
| 1,593,853 | 7/1926 | Smith et al. | 222/154 |
| 1,675,522 | 7/1928 | Weidinger et al. | 272/8 R |
| 1,991,626 | 2/1935 | Rawdon | 237/1 L |
| 2,359,907 | 10/1944 | Gilardi | 434/245 |
| 2,525,232 | 10/1950 | McGaughy | 273/1 L |
| 3,588,099 | 6/1971 | Todd | 273/1 L |
| 3,733,071 | 5/1973 | Levin | 272/8 R |
| 3,924,350 | 12/1975 | Hsu | 273/1 L |
| 4,177,986 | 12/1979 | Campbell | 237/1 L |
| 4,221,073 | 9/1980 | Malczewski | 46/1 R |
| 4,344,759 | 8/1982 | Albert | 434/430 |
| 4,358,013 | 11/1982 | Shebley | 206/232 |
| 4,448,409 | 5/1984 | Kaga et al. | 273/1 L |

FOREIGN PATENT DOCUMENTS 2103940  3/1983  United Kingdom ............... 273/1 L

*Primary Examiner*—James C. Yeung
*Attorney, Agent, or Firm*—George Pappas

[57] ABSTRACT

An apparatus for primarily aiding in teaching born-again Christian religious beliefs includes a base and a hollow structure mounted in upstanding fashion on the base. The structure has a closed bottom, open top, and sidewall with spaced-apart upper and lower opaque wall sections and a middle transparent wall section. The structure defines a chamber representing a person's body. Liquid contained in the chamber represents the person's spirit and its color represents the state of the person's spirit. A pair of valves are respectively mounted to the base and structure. One valve communicates with the chamber bottom and is operable to drain liquid therefrom, representing the death of the person's spirit. The other valve communicates with the chamber middle and is operable to drain portions of the liquid therefrom, displaying the state of the person's spirit. A buoyant character representing the person's soul is movably disposed in the chamber and represents the separateness of the person's soul from the person's body and spirit and the aliveness of the person's soul. An object in the form of a buoyant plastic ball representing a state of unconfessed sin is movably disposed in the chamber. The apparatus also includes a mirror for reflecting an image of the open top of the chamber and an opaque cover for blocking at least a portion of the middle transparent wall section of the chamber.

24 Claims, 2 Drawing Sheets

TEACHING AID APPARATUS

BACKGROUND OF THE INVENTION

1. Field of the Invention

The present invention relates generally to teaching aids and, more particularly, is concerned with an apparatus particularly useful for aiding in the teaching of religious beliefs of born-again Christians.

2. Description of the Prior Art

In recent years, there has been a general spiritual awakening of broad segments of the population to the religious beliefs of born-again Christians. As curiosity and interest continues to spread, there is a pressing need to be able to explain and demonstrate, with clarity and simplicity, the concepts underlying these beliefs. Notwithstanding the fact that the Bible provides the sole written authority from which to teach these beliefs, it would be desirable to have some physical device to aid in teaching of the concepts involved. This is especially important in the instruction of young people.

The use of physical devices to assist in teaching or demonstrating concepts of religious beliefs is generally known in the prior art. Representative of prior art devices of such type are those disclosed in Gilardi U.S. Pat. No. 2,359,907 and Shebley U.S. Pat. No. 4,358,013. However, neither of these prior art devices nor any others appear to have the variety of components necessary to make them adaptable for use in simulating the concepts underlying the born-again Christian faith. Consequently, a need exists to develop an apparatus composed of an array of physical objects and materials useful for teaching these religious beliefs.

SUMMARY OF THE INVENTION

The present invention provides a teaching aid apparatus designed to satisfy the aforementioned needs. The apparatus of the present invention is particularly suited for use to aid in teaching the religious beliefs of born-again Christians although its use need not necessarily be so limited. The apparatus employs ordinary physical objects and materials that are readily recognized and understood by substantially all persons of school age and above. The components of the apparatus give the mental concepts of these religious beliefs a physical reality to which young people can readily relate so that a more lasting understanding of them can be gained.

Accordingly, the present invention is directed to a teaching aid apparatus which comprises: (a) a chamber mounted in upstanding fashion and having a bottom, a top, and a sidewall with spaced-apart upper and lower opaque wall sections and a middle transparent wall section disposed between the upper and lower wall sections, the chamber being capable of containing liquid therein; (b) first means connected in communication with the chamber at the bottom thereof and being operable to drain all of the liquid therefrom; (c) second means connected in communication with the chamber at the middle transparent wall section of the sidewall thereof and being operable to drain portions of the liquid therefrom; (d) a first object movably disposable in the chamber; (e) a second object movably disposable in the chamber; and, (f) third means for controlling the respective movements and positions of the first and second objects within the liquid contained in the chamber.

More particularly, the first and second objects are each biased to move upwardly within the liquid contained in the chamber. Preferably, the first object is a figure-like character being buoyant within the liquid, whereas the second object is a plastic ball being buoyant within the liquid. Also, the chamber is defined by a hollow structure being mounted upon a base. In one embodiment, the hollow structure has a generally rectangular box-like shape, whereas in an alternative embodiment it has a generally cylindrical shape.

Still further, the first means is a valve mounted to the base and connected in communication with the bottom of the chamber, whereas the second means is a valve mounted to the hollow structure and connected in communication with the middle wall section of the chamber sidewall. The third means includes first and second hollow tubes, and first and second flexible string-like members. Each tube has open opposite upper and lower ends and is mounted in the interior of the chamber along the sidewall thereof. Each member extends through one of the tubes and has opposite upper and lower end portions extending respectively from the open opposite upper and lower ends of the tube. The lower end portions of the first and second members are respectively connected to the first and second objects, whereas the upper end portions of the first and second members are respectively free for manual grasping to cause movement and positioning of the objects within the chamber.

In addition, the apparatus includes a mirror for reflecting an image of the open top of the chamber. Also, an opaque cover is provided for blocking at least a portion of the middle transparent wall section of the chamber.

In terms of the concepts underlying born-again Christian beliefs which preferably the apparatus can be used to demonstrate as an aid in teaching such beliefs, the chamber represents a person's body, the liquid contained in the chamber represents the person's spirit and the color of the liquid represents the state of the person's spirit. The first valve, when operated to drain all of the liquid from the chamber, represents the death of the person's spirit, whereas the second valve, when operated to drain portions of the liquid therefrom displays the state of the person's spirit. The buoyant character disposed within the liquid of the chamber and capable of being moved by pulling on or releasing the first flexible member represents the person's soul and its separateness from the person's body and spirit as well as its aliveness. The buoyant object disposed within the liquid of the chamber and capable of being movable by pulling on or releasing the second flexible member represents the presence or absence of a state of unconfessed sin of the person.

Finally, the opaque nature of the upper and lower wall sections and the transparent nature of the middle wall section of the chamber structure represent the concept that other persons can look at the person's body but only see that portion of the person's spirit represented by the portion of the liquid located at the level of the middle transparent wall section of the structure. The open top of the chamber structure represents the concept that only God can look through the person's body and see the totality of the person's spirit and his or her state of unconfessed sin. The mirror is used to show the students being instructed what God sees.

These and other advantages and attainments of the present invention will become apparent to those skilled in the art upon a reading of the following detailed description when taken in conjunction with the drawings.

BRIEF DESCRIPTION OF THE DRAWINGS

In the course of the preceding discussion and following detailed description, reference has been and will be made to the attached drawings in which.

DETAILED DESCRIPTION OF THE PREFERRED EMBODIMENTS

Figure 1:
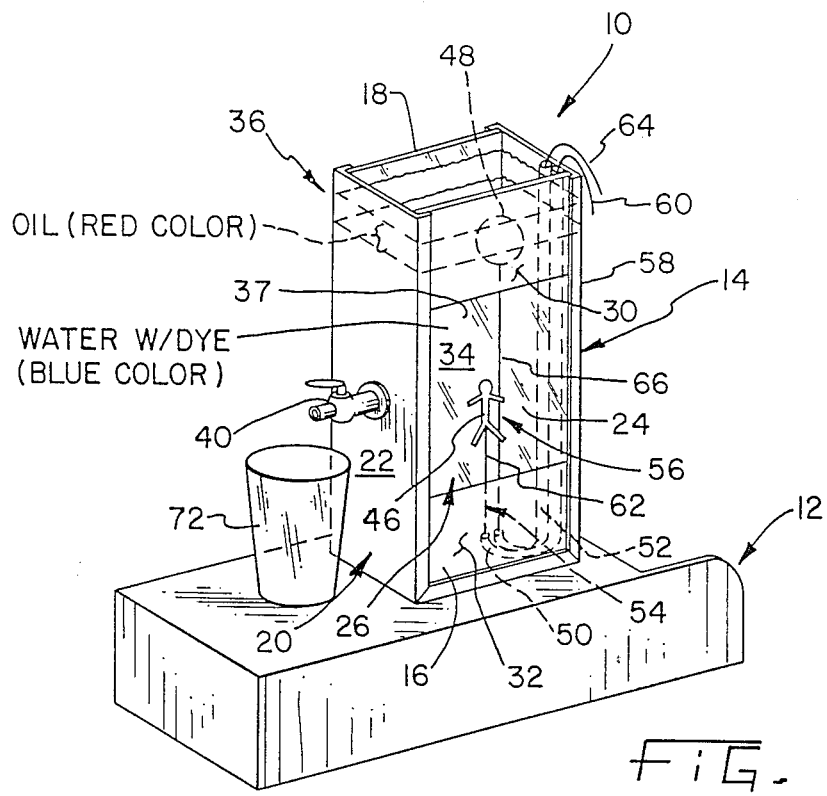
FIG. 1 is a perspective view of one embodiment of a religious teaching aid apparatus constructed in accordance with the present invention and as seen from a front side of the apparatus.

In the following description, like reference characters designate like or corresponding parts throughout the several views of the drawings.

Figure 2:
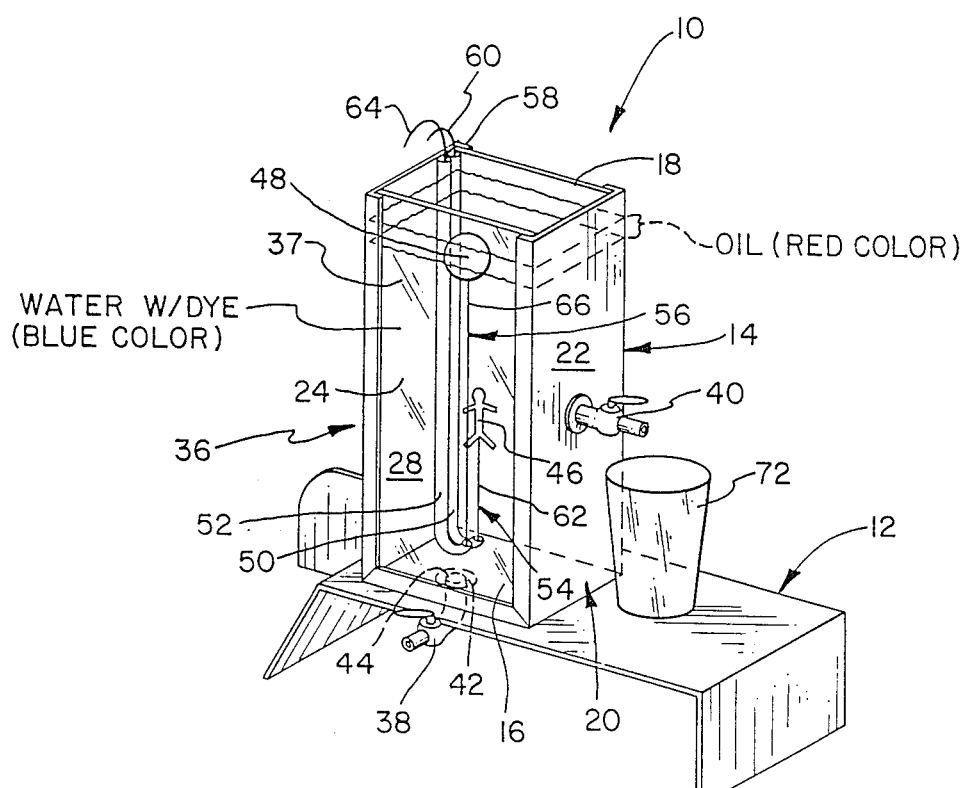
FIG. 2 is another perspective view of the apparatus of FIG. 1 as seen from a rear side of the apparatus.

Referring now to the drawings, and particularly to FIGS. 1 and 2, there is shown a teaching aid apparatus, being generally designated by the numeral 10 and constructed in accordance with the present invention. The primary purpose of the apparatus 10 is for use to aid in teaching the concepts underlying born-again Christian religious beliefs to persons of various ages.

Figure 3:
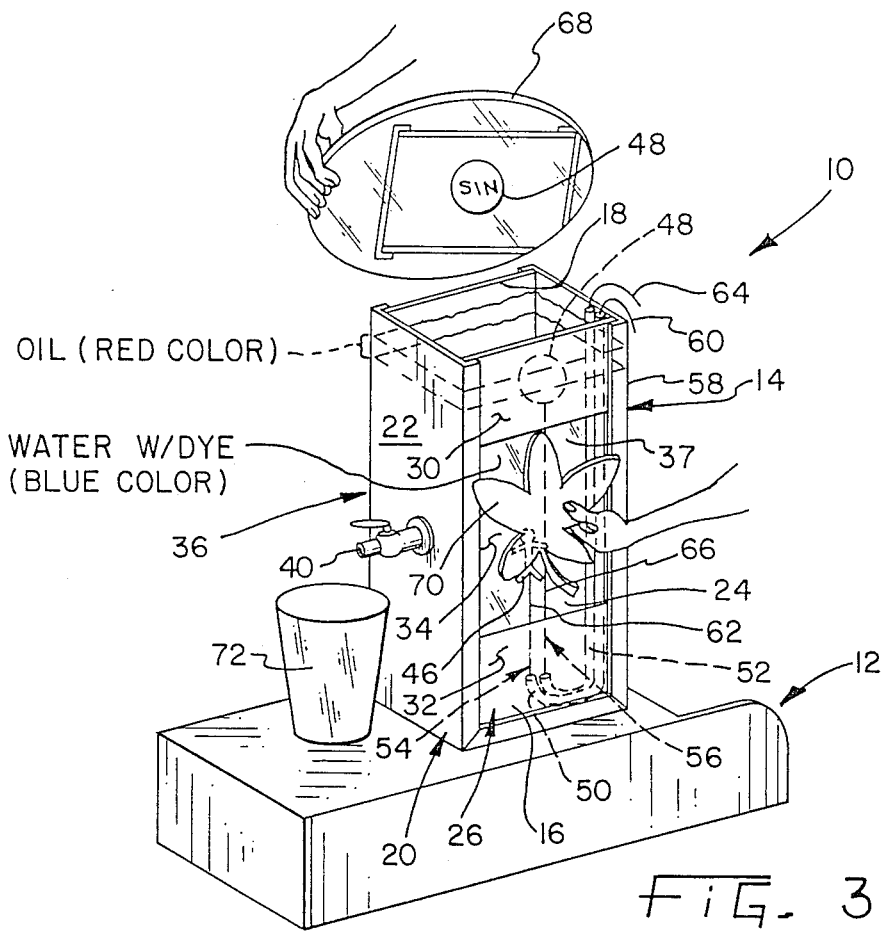
FIG. 3 is still another perspective view of the apparatus of FIG. 1 showing other components thereof; and, FIG. 4 is a perspective view of an alternative embodiment of the religious teaching aid apparatus of the present invention.

In its basic components, the teaching aid apparatus 10 includes a base 12 and a hollow structure 14 mounted in upstanding fashion on the base. In the embodiment of FIGS. 1-3, the structure 14 has a generally rectangular box-like shape and is composed of a closed bottom 16, an open top 18, and a continuous sidewall 20. The sidewall 20 of the structure 14 is made up of opposing opaque side portions 22 and 24 and opposing front and rear portions 26 and 28 extending between and interconnecting the side portions 22 and 24. The rear portion 28 of the sidewall 20 is transparent throughout, whereas the front portion 26 of the sidewall 20 has spaced apart upper and lower opaque wall sections 30 and 32 and a middle transparent wall section 34 extending between the upper and lower wall sections 30 and 32. The bottom 16, top 18 and sidewall 20 of the hollow structure 14 define a liquid containment chamber 36 into which liquid 37 can be poured through the open top 18 of the structure 14.

Other basic components of the teaching aid apparatus 10 are first and second means or drain valves 38 and 40. The first drain valve 38 is mounted to the base 12 adjacent to and below the rear portion 28 of the sidewall 20 of the hollow structure 14. The first valve 38 is operated by being manually turned between closed and opened conditions. The first valve 38 is connected by a conduit 42 to an opening 44 in the structure bottom 16 to provide flow communication between the valve and the bottom of the liquid containment chamber 36. When turned to its opened condition, the first valve 38 will allow draining of all of the liquid 37 from the chamber 36 through the bottom thereof.

The second drain valve 40 is mounted to the one side portion 22 of the structure sidewall 20 at a location about midway between its upper and lower ends. Thus, the second valve 40 is disposed on the structure 14 adjacent to, but angularly displaced ninety degrees from, the middle transparent wall section 34 of the front portion 26 of the structure's sidewall 20. The second valve 40 is also operated by turning between opened and closed conditions and is connected directly to the side portion 22 to provide flow communication with the liquid containment chamber 36. When turned to its opened condition, the second valve 40 will allow draining of liquid 37 only from approximately the upper half of the chamber 36.

In still other of its basic components, the teaching aid apparatus 10 includes a first object 46 in the form of a buoyant figure-like character and a second object 48 in the form of a buoyant plastic ball, such as a ping-pong ball. The character 46 and ball 48 both reside in the chamber 36 and are inherently sufficiently buoyant to move upwardly within liquid 37 and reach the top surface thereof where both would be located behind the upper opaque wall section 30 of the structure sidewall front portion 26 such that neither can be observed through the middle transparent wall section 34 thereof. However, it should be noted that both objects, when floating on or near the liquid surface, still can be viewed through the transparent rear portion 28 of the structure sidewall 20, as depicted in FIG. 2. It should be noted that instead of relying on buoyancy, the character 46 and ball 48 can each be mounted on a separate spring which would cause them to rise to the surface of the liquid 37.

In order to lower the character 46 and ball 48 within the liquid 37 toward the bottom of the chamber 36 and against their inherent buoyancy, first and second means are provided in the apparatus 10 to perform such tasks. The first and second means respectively take the form of identical pairs of first and second hollow tubes 50 and 52 and first and second flexible string-like members 54 and 56.

The first hollow tube 50 has open opposite upper and lower ends and is mounted in the interior of the chamber 36 along a corner 58 of the structure sidewall 20 formed by the front portion 26 and other side portion 24 thereof. The opposite upper and lower ends of the first tube 50 are respectively located substantially adjacent to the top 18 and bottom 16 of the structure 14. The first string-like member 54 extends through the first tube 50 and has opposite upper and lower end portions 60 and 62 extending from the open opposite upper and lower ends of the first tube 50. The lower end portion 62 of the first member 54 is connected to the character 46, whereas the upper end portion 60 of the first member 54 is free for manual grasping to either pull on or release the pulling on the character 46 to cause movement and positioning of the character 46 within the chamber 36.

The second hollow tube 52 likewise has open opposite upper and lower ends and is mounted adjacent to and in a coextensive relationship with the first hollow tube 50 in the interior of the chamber 36 along the corner 58 of the structure sidewall 20. The second flexible string-like member 56 extends through the second tube 52 and has opposite upper and lower end portions 64 and 66 extending from the open opposite upper and lower ends of the second tube 52. The lower end portion 66 of the second member 56 is connected to the ball 48, whereas the upper end portion 64 of the second member 56 is free for manual grasping to either pull on or release the pulling on the ball 48 to cause movement and positioning of the ball 48 within the chamber 36. It should be noted that the first and second string-like members 54 and 56 can be used regardless of whether the character 46 and ball 48 are inherently buoyant or biased upwardly by springs. By merely pulling on the members 54 and 56 either buoyancy or spring bias can be overcome to cause lowering of the character 46 and ball 48 to the bottom of the chamber 36.

Finally, the teaching aid apparatus 10 includes a mirror 68, opaque cover 70 having the shape of a leaf, and a transparent glass 72. The mirror 68 is used for reflecting an image of the interior of the chamber 36 as seen through the open top 18 thereof. The opaque cover 70 is for blocking at least a portion of the middle transparent wall section 34 of the structure sidewall front portion 26.

Figure 4:
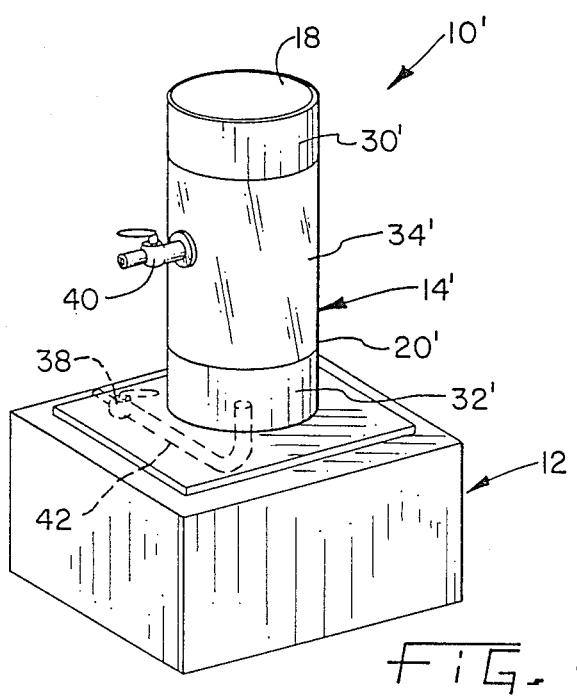

An alternative embodiment of a hollow structure 14' of the teaching aid apparatus 10' is shown in FIG. 4. Here, the structure 14' of the apparatus 10' has a generally cylindrical shape. The structure 14' has a continuous sidewall 20' which includes upper and lower opaque cylindrical-shaped wall sections 30' and 32' and a middle transparent cylindrical-shaped wall section 34'. Each of the wall sections 30', 32' and 34' extend completely around the structure 14'.

In terms of the concepts underlying born-again Christian beliefs which preferably the apparatus 10 can be used to demonstrate as an aid in teaching such beliefs, the chamber 36 represents a person's body, the liquid 37 contained in the chamber 36 represents the person's spirit and the color of the liquid 37 represents the state of the person's spirit. The first valve 38, when operated to drain all of the liquid 37 from the chamber 36, represents the death of the person's spirit, whereas the second valve 40 when operated to drain portions of the liquid 37 therefrom displays the state of the person's spirit. The buoyant character 46 disposed within the liquid 37 of the chamber 36 and capable of being moved by pulling on or releasing the first flexible member 54 represents the person's soul and its separateness from the person's body and spirit as well as its aliveness. The buoyant ball 48 disposed within the liquid 37 of the chamber 36 and capable of being moved by pulling on or releasing the second flexible member 56 represents the presence or absence of a state of unconfessed sin of the person.

The opaque nature of the upper and lower wall sections 30 and 32 and the transparent nature of the middle wall section 34 of the chamber structure 14 represent the concept that other persons can look at the person's body but only see that portion of the person's spirit represented by the portion of the liquid 37 located at the level of the middle transparent wall section 34 of the structure 14. The open top 18 of the chamber structure 14 represents the concept that only God can look through the person's body and see the totality of the person's spirit and his or her state of unconfessed sin. The mirror 68 is used to show the students being instructed what God sees. The opaque cover 70 represents the means by which people try to cover their sin.

In using the apparatus 10 as an aid in teaching born-again Christian beliefs, an instructor first fills the chamber 36 with a liquid 37 in the form of clear water. This represents the sin-free condition of man's spirit when God created Adam. Next, a blue dye is added to the clear water which changes it color to blue. This represents a state of sinfulness which takes over the whole spirit. No matter how much liquid 37 is then drained from the second upper valve 40 which represents good works done by the person and, no matter how much clear water is poured back into the chamber 36, the person's spirit will still retain sin.

When the person receives Christ within his or her spirit, this is represented by pouring red-colored oil within the liquid containment chamber 36. The red oil represents the grace of God bestowed on the person. However, since the oil floats on the water, the colored oil will be blocked from view by the upper opaque wall section 30 and not be seen by other people. They will continue to see the sinful nature of the person as represented by the bluish colored water seen through the middle transparent wall section 34. Not until the person studies the Bible and becomes really committed to God, as represented by the pouring of more oil into the chamber 36, will the oil become visible through the middle transparent wall section 34 and noticed by others.

A person has free will and can choose to commit sin. The instructor can manipulate the character 46 up and down in the liquid 37 to show activity of the person and the decision to commit sin. When sin is committed, it is represented by the instructor releasing the ball 48 so that it rises to the top of the liquid 37. Even though the ball 48 is hidden by the upper opaque wall section 30 so that other people cannot see that the person is in a state of unconfessed sin, God who looks at the person's spirit through the open top 18 of the chamber structure 14 sees that the person is in a state of unconfessed sin. The existence of such state prevents God from bestowing any more grace on the person. Thus, the instructor will not pour any additional oil into the chamber 36. The instructor holds up the mirror 68 at a forty-five degree angle above the structure 14 to show the students what God sees in the person's spirit by looking through the open top 18 of the structure 14. Normally, the view of the students is confined to looking through the middle transparent wall section 34.

Whenever liquid 37 is drained from the second valve 40, it is emptied into the clear glass 72. The glass 72 represents the children of the person who usually take on the nature of their parents from whom they are receiving signals about what kind of life to lead.

It is thought that the religious teaching aid apparatus of the present invention and many of its attendant advantages will be understood from the foregoing description and it will be apparent that various changes may be made in the form, construction and arrangement thereof without departing from the spirit and scope of the invention or sacrificing all of its material advantages, the forms hereinbefore described being merely preferred or exemplary embodiments thereof.

What is claimed is:

1. A teaching aid apparatus, comprising:
  (a) a chamber mounted in upstanding fashion and having a bottom, a top, and a sidewall with spaced-apart upper and lower opaque wall sections and a middle transparent wall section disposed between said upper and lower wall sections, said chamber being capable of containing liquid therein;
  (b) first means connected in communication with said chamber at said bottom thereof and being operable to drain all of the liquid therefrom;
  (c) second means connected in communication with said chamber at said middle transparent wall section of said sidewall thereof and being operable to drain portions of the liquid therefrom;
  (d) a first object movably disposed in said chamber;
  (e) a second object movably disposed in said chamber; and, (f) third means for controlling the respective movements and positions of said first and second objects within the liquid contained in said chamber.

2. The apparatus as recited in claim 1, wherein said first and second objects are each biased to move upwardly within the liquid contained in said chamber.

3. The apparatus as recited in claim 1, wherein said first object is a figure-like character being buoyant within the liquid.

4. The apparatus as recited in claim 1, wherein said second object is a plastic ball being buoyant within the liquid.

5. The apparatus as recited in claim 1, wherein said top of said chamber is open.

6. The apparatus as recited in claim 1, wherein said chamber is defined by a hollow structure.

7. The apparatus as recited in claim 6, wherein said hollow structure has a generally rectangular box-like shape.

8. The apparatus as recited in claim 6, wherein said hollow structure has a generally cylindrical shape.

9. The apparatus as recited in claim 6, further comprising a base upon which is mounted said hollow structure defining said chamber.

10. The apparatus as recited in claim 9, wherein said first means is a valve mounted to said base and connected in communication with said bottom of said chamber.

11. The apparatus as recited in claim 6, wherein said second means is a valve mounted to said hollow structure and connected in communication with said middle wall section of said chamber.

12. The apparatus as recited in claim 1, wherein said third means includes:
   first and second hollow tubes, each tube having open opposite upper and lower ends and being mounted in the interior of said chamber along said sidewall thereof; and,
   first and second flexible string-like members, each member extending through one of said tubes and having opposite upper and lower end portions extending respectively from said open opposite upper and lower ends of said tube, said lower end portions of said first and second members being respectively connected to said first and second objects and said upper end portions of said first and second members being respectively free for manual grasping to cause movement and positioning of said objects within said chamber.

13. The apparatus as recited in claim 1, further comprising a mirror for reflecting an image of said top of said chamber.

14. The apparatus as recited in claim 1, further comprising an opaque cover for blocking at least a portion of said middle transparent wall section of said chamber.

15. An apparatus for aiding in teaching born-again Christian religious beliefs, comprising:
   a base;
   a hollow structure mounted in upstanding fashion on said base and having a closed bottom, an open top, and a sidewall with spaced-apart upper and lower wall sections being opaque in nature and a middle wall section disposed between said upper and lower wall sections and being transparent in nature, said bottom, top and sidewall of said structure defining a liquid containment chamber representing a person's body;
   a quantity of liquid contained in said chamber of said hollow structure, said liquid representing the person's spirit and the color of said liquid representing the state of the person's spirit;
   a first valve mounted to said hollow structure and connected in communication with said chamber at said bottom thereof and being operable to drain liquid therefrom to represent the death of the person's spirit;
   a second valve mounted to said hollow structure and connected in communication with said chamber at said middle transparent wall section of said sidewall thereof and being operable to drain liquid therefrom to display the state of the person's spirit;
   said opaque nature of said upper and lower wall sections and the transparent nature of said middle wall section of said structure representing the concept that other persons can look at the person's body but only see that portion of the person's spirit being represented by the portion of said liquid located at the level of said middle transparent wall section of said structure; and,
   said open top of said structure representing the concept that only God can look through the person's body and see the totality of the person's spirit and state of unconfessed sin.

16. The apparatus as recited in claim 15, further comprising a mirror for reflecting an image of said open top of said chamber.

17. The apparatus as recited in claim 15, further comprising an opaque cover for blocking at least a portion of said middle transpare wall section of said chamber.

18. An apparatus for aiding in teaching born-again Christian religious beliefs, comprising:
   a base;
   a hollow structure mounted in upstanding fashion on said base and having a closed bottom, an open top, and a sidewall with spaced-apart upper and lower wall sections being opaque in nature and a middle wall section disposed between said upper and lower wall sections and being transparent in nature, said bottom, top and sidewall of said structure defining a liquid containment chamber representing a person's body;
   a quantity of liquid contained in said chamber of said hollow structure, said liquid representing the person's spirit and the color of said liquid representing the state of the person's spirit;
   a first valve mounted to said hollow structure and connected in communication with said chamber at said bottom thereof and being operable to drain liquid therefrom to represent the death of the person's spirit;
   a second valve mounted to said hollow structure and connected in communication with said chamber at said middle transparent wall section of said sidewall thereof and being operable to drain liquid therefrom to display the state of the person's spirit;
   a character disposed in said chamber and inherently buoyant to move upwardly within liquid contained therein, said character representing the person's soul;
   first means connected to said character and extending to the exterior of said hollow structure, said first means being operable for controlling the movement and position of said character within said liquid contained in said chamber for representing the separateness of the person's soul from the person's body and spirit and the aliveness of the person's soul;

an object disposed in said chamber and inherently buoyant to move upwardly within said liquid contained therein, said object representing a state of unconfessed sin;

second means connected to said object and extending to the exterior of said hollow structure, said second means being operable for controlling the movement and position of said object within said liquid contained in said chamber for representing the person's state of unconfessed sin;

said opaque nature of said upper and lower wall sections and the transparent nature of said middle wall section of said structure representing the concept that other persons can look at the person's body but only see that portion of the person's spirit being represented by the portion of said liquid located at the level of said middle transparent wall section of said structure; and, said open top of said structure representing the concept that only God can look through the person's body and see the totality of the person's spirit and state of unconfessed sin.

19. The apparatus as recited in claim 18, wherein said hollow structure has a generally rectangular box-like shape.

20. The apparatus as recited in claim 18, wherein said hollow structure has a generally cylindrical shape.

21. The apparatus as recited in claim 18, wherein said first means includes:

a first hollow tube having open opposite upper and lower ends and being mounted in the interior of said chamber along said sidewall thereof; and a first flexible string-like member extending through said first tube and having opposite upper and lower end portions extending from said open opposite upper and lower ends of said first tube, said lower end portion of said first member being connected to said character and said upper end portion of said first member being free for manual grasping to cause movement and positioning of said character within said chamber.

22. The apparatus as recited in claim 18, wherein said second means includes:

a second hollow tube having open opposite upper and lower ends and being mounted in the interior of said chamber along said sidewall thereof; and a second flexible string-like member extending through said second tube and having opposite upper and lower end portions extending from said open opposite upper and lower ends of said second tube, said lower end portion of said first member being connected to said object and said upper end portion of said second member being free for manual grasping to cause movement and positioning of said object within said chamber.

23. The apparatus as recited in claim 18, further comprising a mirror for reflecting an image of said open top of said chamber.

24. The apparatus as recited in claim 18, further comprising an opaque cover for blocking at least a portion of said middle transparent wall section of said chamber.

* * * * *